Nov. 12, 1940.　　　K. C. D. HICKMAN　　　2,221,691
VACUUM DISTILLATION
Filed Sept. 28, 1938
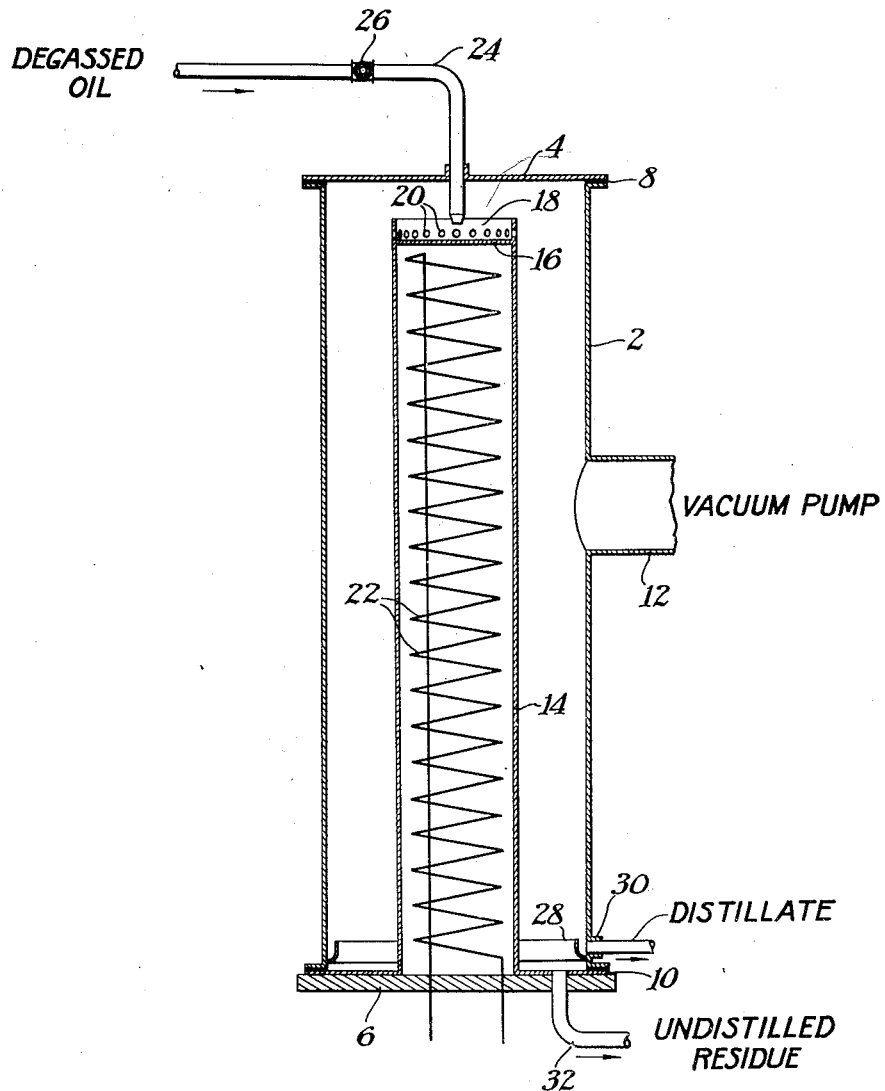
KENNETH C.D. HICKMAN
INVENTOR
BY
ATTORNEYS Patented Nov. 12, 1940

2,221,691

UNITED STATES PATENT OFFICE 2,221,691

VACUUM DISTILLATION

Kenneth C. D. Hickman, Rochester, N. Y., assignor to Distillation Products Inc., Rochester, N. Y., a corporation of Delaware Application September 28, 1938, Serial No. 232,157

3 Claims. (Cl. 202—52)

This invention pertains to a process of vacuum distillation and particularly to an improved process of high vacuum distillation wherein vaporizing and condensing surfaces are separated by substantially unobstructed space.

When molecular distillation was first discovered and described, little distinction was made between the pressure of the vapor molecules and the pressure of the residual non-condensible gas molecules which were both present in the gap between the distilling and condensing surfaces. Early investigators considered that it was necessary to condense the distilling molecules before they had collided with themselves or molecules of residual gas. In other words, for successful distillation it was thought to be necessary to condense the distilling molecules upon a condensing surface located at a distance from the vaporizing surface of less than the mean free path of the distilling vapor molecules. It was considered that with distances greater than twice the mean free path of the distilling molecules, distillation substantially completely ceased.

This invention has for its object to provide an improved distillation process whereby substances can be distilled under high vacuum conditions and the vapors condensed upon a condensing surface separated from the vaporizing zone by substantially unobstructed space and by a distance substantially greater than that heretofore employed. Other objects will become apparent from the following description and claims.

In performing distillations under molecular conditions, it was discovered that the distance of condensation or, in other words, the gap between the vaporizing and condensing surfaces was not a critical factor as was originally supposed. It was found, for instance, that carrying out distillation under the same identical conditions, such as pressure, temperature, rate of flow, size of vaporizing column, etc., that the rate of distillation was substantially the same regardless of whether the vaporizing surface was located at a distance from the column of one times the mean free path of the distilling molecules or distances corresponding to many multiples of the mean free path such as 3 to 20 times the mean free path. These greater distances represented distillation under conditions wherein the distilling molecules collided with each other numerous times in passing between the two surfaces. Thus it was evident that it is not essential for low temperature distillation, that the molecules shall suffer few or no collisions as was believed to be the case by earlier investigators.

There is a profound difference between collisions of the distilling molecules with themselves and collisions with residual gas. Collisions of the distilling molecules with residual gas hinder distillation greatly and to an extent depending upon their direction of travel. Collisions of vapor molecules with one another are substantially harmless. The residual gas may come from the distilland by decomposition or liberation from solution. It may also be present as a result of leakage in the apparatus or by reflection or re-entry of gas coming from leakage or decomposition. Residual gas derived from the distilland is proceeding in the same direction as the distilland vapor and collisions between the distilland and this gas does not seriously hinder the passage of the vapor to the condensng surface. However, when these two components arrive at the condensing surface, the distilling vapors are condensed leaving the non-condensible gas free to wander backwards. Therefore, residual gas from this source ultimately hinders distillation as actively as the gas derived from leakage and other sources.

Collisions between the vapor molecules are largely unobjectionable because these molecules have been ejected from the distilland surface in a direction towards the condenser. Collisions between one such molecule and another will retard some and accelerate others, but the average persistent velocity of the entire aggregate in the direction of the condenser will remain unchanged. These collisions, therefore, are more in the nature of jostlings, much as animals traveling together in a caravan will jostle one another sideways without impeding the progress of the caravan. Such jostlings do not seriously affect the distillation and can, therefore, take place without affecting the course of the distillation.

The distilland is heated on the vaporizing surface, and preferably in the form of a thin film as in ordinary molecular distillation. This can be conveniently accomplished by permitting it to flow by gravity down the external wall of a vertical heated column. The temperature at which the column will be heated will, of course, depend upon the particular distilland under consideration and will usually vary from about room temperature to 325°. The temperature of the column should in each case be such as to give a saturation pressure of distilling vapor of between about $10^{-7}$ mm. and .001 mm. of mercury as in ordinary molecular distillation. Temperatures of between about 90° and 275° and, particularly, 120–250° will be found to be best for distilling vitamins from fish oils. Pressures of less than about .1 mm. should be employed. Pressures in the range of about .01 to .0001 will be found to be most generally satisfactory. The pressures defined are measured by a Pirani gauge calibrated against dry air, the gauge tube being situated outside the still and attached by a pipe not less than .5 cm. wide introduced into the distilling gap at a point approximately farthest from the point of exhaustion.

The mean free path can be determined with ample precision by reference to any modern text book on the dynamic theory of gases and to tables on physical constants such as "Physical and Chemical Constants and Some Mathematical Functions" by G. W. C. Kaye and T. H. Laby, published by Longmans Green & Co. 1921 pages 34 and 35.

In the accompanying drawing I have illustrated apparatus suitable for the carrying out of a distillation process in accordance with my invention. Referring to the drawing, numeral 2 designates a cylindrical casing closed at the top and bottom by plates 4 and 6, respectively. Gaskets 8 and 10 serve to make gas-tight connections. Numeral 12 designates a conduit connected to an evacuating pump (not shown) for evacuating this closed system. Numeral 14 designates a cylinder of substantially smaller diameter than casing 2 which is integral with base plate 6 and which is located so that it is approximately concentric with casing 2. Cylinder 14 is closed at the top by plate 16 to form a small reservoir 18 at the lower portion of which is located a plurality of holes 20. Numeral 22 designates an electrical heating unit extending throughout the length of the cylinder 14. Numeral 24 designates a conduit which terminates above reservoir 18 and is provided with a valve 26 for controlling the rate of introduction of distilland. Numeral 28 designates an annular gutter mounted upon the inside wall of casing 2 and at the lower portion thereof. Numeral 30 designates a conduit connecting with gutter 28 and serves to withdraw liquid distillate from the still. Numeral 32 designates a withdrawal conduit for removing undistilled residue from the still.

The distance between the vaporizing and condensing surfaces 14 and 2, respectively, is seen to be unobstructed by any structural elements. Also, due to the fact that the condensing surface or casing 2 is located in front of vaporizing surface 14 and coextensive therewith, there is no obstruction to the direct and free passage of vapors from the vaporizing to the condensing surface.

In operating the apparatus illustrated in the drawing the system is evacuated through conduit 12 to a low pressure such as, for instance, the .001 mm. Degassed oil is introduced through conduit 24 and electrical unit 22 is put in operation. The oil collects in reservoir 18 and flows evenly through holes 20 down the surface of cylinder 14 in a thin film. Vapors pass to cool condensing surface 2, are condensed thereon, and flow by gravity into gutter 28 and removal conduit 30. Undistilled liquid is withdrawn through conduit 32.

The procedure described herein can be employed to distill difficultly volatilizable organic substances. Examples of materials to which my invention can be applied with particular advantage are hydrocarbons and distillates thereof, vegetable and animal oils, fats, waxes, and concentrates thereof, and organic mixtures containing therapeutically active materials. My invention is of particular advantage for separating and purifying hormones, vitamins, enzymes, and the like from materials containing them, such as fish oils, for instance cod, halibut, tuna, sardine, burbot, pollack, etc., fish oils; corn, cottonseed and wheat germ oils; fatty vegetable extracts, etc.

A decided advantage of the invention is that much larger condensing surfaces relative to the vaporizing surface can be used. In all vacuum distillations of this general type it is necessary that efficient condensation take place when the distilling vapors arrive at the condensing surface. With the small separations heretofore considered necessary, the area of the condensing surfaces was necessarily limited to a size closely approximating the area of the vaporizing surface. With substantially greater chambers surrounding the vaporizing surface, the condensing surface can be of almost unlimited area resulting in greatly increased condensation efficiency. Thus, a small heated column or sphere situated at the center of a larger hollow sphere many times its diameter would be entirely suitable for distillation in accordance with my invention. Furthermore, it is not necessary that the hot vaporizing surfaces shall be in the center of the cold sphere, nor need their shape be similar. For example, a cylindrical vertical vaporizing surface could be placed at one end of a horizontal rectangular box serving as a condensing surface.

An added advantage is that with the larger condensing surfaces, the condensate is spread over a much larger area. The condensing surface therefore remains cooler and does not require the application of cooling fluid. Also, if, during the distillation, solids are deposited on the condenser, the larger container provides useful storage space so that there is no need to withdraw the solids from the still during a normal commercial run. Thus, during the distillation of a fish oil in an ordinary molecular still, a layer of cholesterol may become built up on the condenser and protrusions may soon meet the distilland and cause intermixture with the distillate. Furthermore, the cholesterol being a poor conductor of heat, the inside layer becomes too hot to continue efficient condensation. According to the present invention, the cholesterol is deposited over the much larger area of the distant condensing surface. This larger surface presents greater opportunity for the heat to escape and the layer of cholesterol is thinner for a given weight of material distilled, providing greater thermal conductivity, so that the advantages are twofold.

Another advantage is that the still can be fitted with mechanical distributors, scraping devices, etc., which would not be conveniently housed in a small shell. Also it may be necessary to withdraw these cumbersome fittings through the main body of the still during the cleaning operation. When the condensing surface closely surrounds the evaporating surface, disassembly by this means is not possible.

What I claim is:

1. The high vacuum distillation process which comprises in combination, subjecting a distillable organic substance to distillation by causing it to flow in the form of a thin film over a heated vaporizing surface which is maintained under a high vacuum and condensing vaporized molecules upon a condensing surface which is located substantially in front of the vaporizing surface and coextensive therewith so that there is no intervening obstruction to the free and direct passage of vapors from the vaporizing surface to the condensing surface, said condensing surface being at a distance from the vaporizing surface of greater than three times the mean free path of the distilling molecules and the vapor pressure of the distilling molecules being maintained during the distillation at a pressure of between .001 and $10^{-7}$ mm.

2. The high vacuum distillation process which comprises in combination, subjecting a distillable organic substance to distillation by causing it to flow in the form of a thin film over a heated vaporizing surface which is maintained at a pressure below .1 mm. and condensing vaporized molecules upon a condensing surface which is located substantially in front of the vaporizing surface and coextensive therewith so that there is no intervening obstruction to the free and direct passage of vapors from the vaporizing surface to the condensing surface, said condensing surface being at a distance from the vaporizing surface of greater than three times the mean free path of the distilling molecules and the vapor pressure of the distilling molecules being maintained during the distillation at a pressure of between .001 and $10^{-7}$ mm.

3. The high vacuum distillation process which comprises subjecting an oil which contains a vitamin to distillation by causing it to flow in the form of a thin film over a vaporizing surface which is maintained under a pressure of less than .01 mm. and which is heated to a temperature of between approximately 120° and 250° C. and condensing distilling vapor molecules upon a condensing surface which is located substantially in front of the vaporizing surface and coextensive therewith so that there is no intervening obstruction to the free and direct passage of vapors from the vaporizing surface to the condensing surface, said condensing surface being at a distance from the vaporizing surface of greater than three times the mean free path of the distilling molecules and the vapor pressure of the distilling molecules being maintained during the distillation at a pressure of between .001 and $10^{-7}$ mm.

KENNETH C. D. HICKMAN.